Aug. 19, 1930.   R. T. OSMAN   1,773,496
SELF PROPELLED VEHICLE
Filed Nov. 19, 1926   5 Sheets-Sheet 2

R.T.Osman,
By Arthur H. Sturges
Attorney

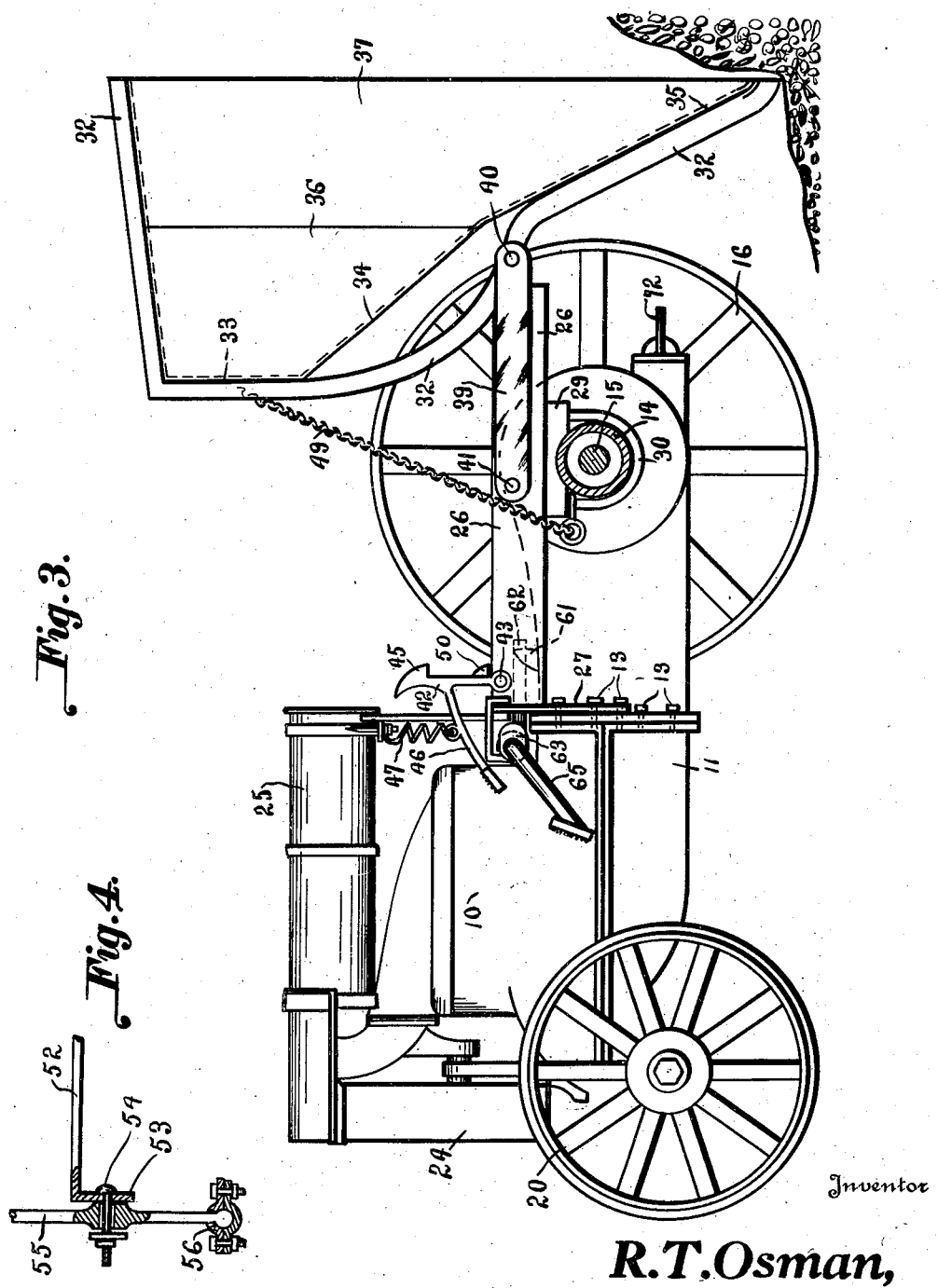

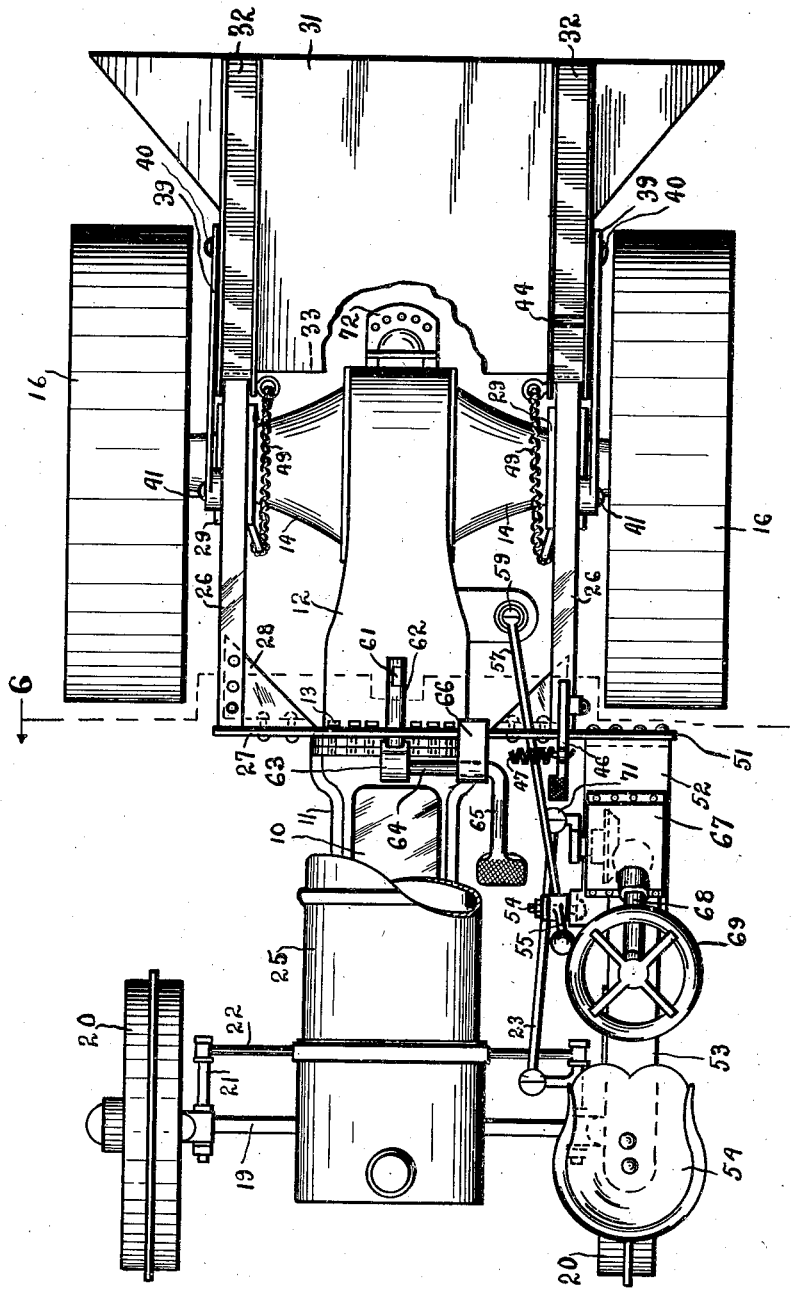

Aug. 19, 1930.   R. T. OSMAN   1,773,496
SELF PROPELLED VEHICLE
Filed Nov. 19, 1926   5 Sheets-Sheet 5
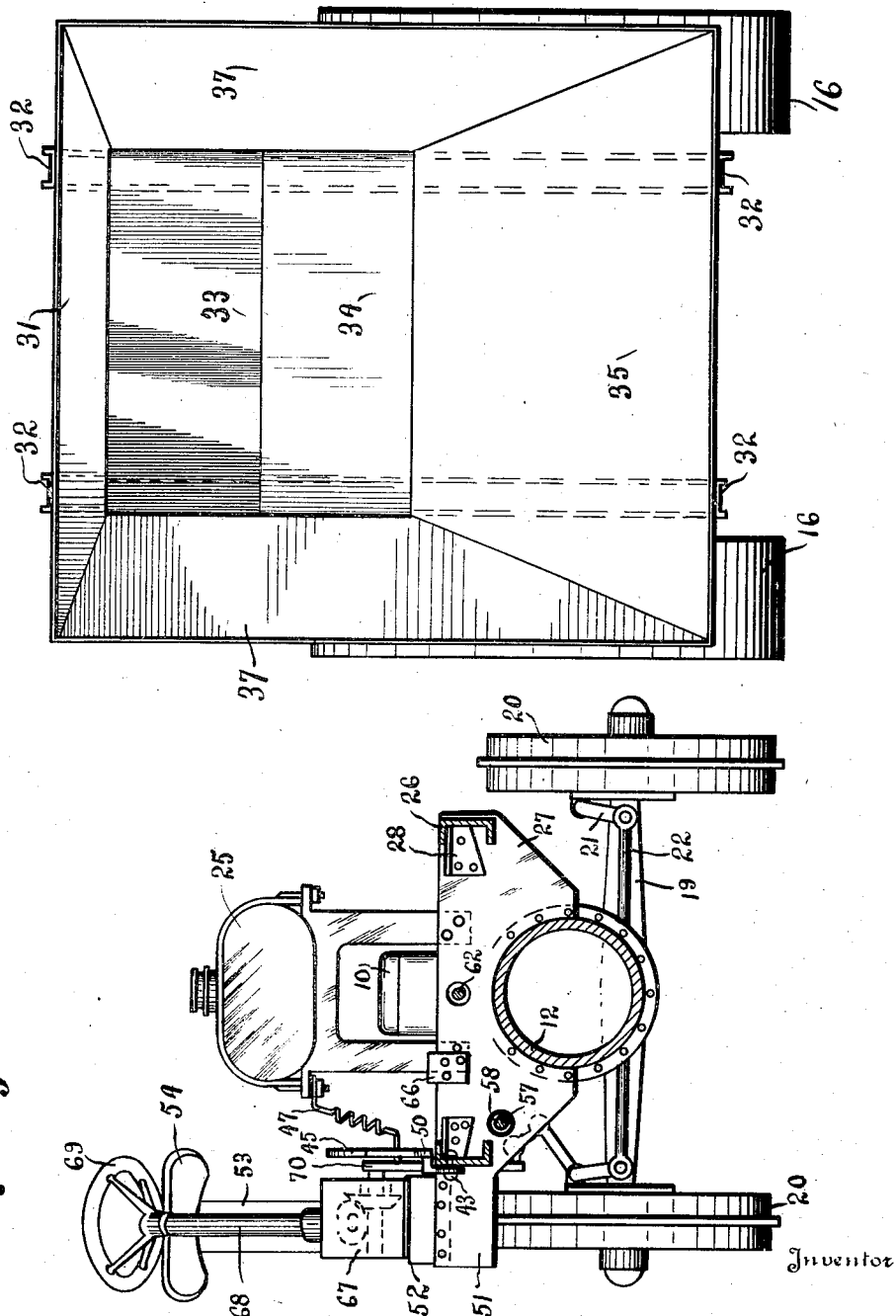
R.T.Osman,
By Arthur H. Sturges
Attorney Patented Aug. 19, 1930

1,773,496

UNITED STATES PATENT OFFICE

RALPH T. OSMAN, OF AMES, IOWA

SELF-PROPELLED VEHICLE

Application filed November 19, 1926. Serial No. 149,362.

The present invention relates to self propelled vehicles, and more particularly to that type adapted for use in carrying loads of material where short wheel base vehicles are required.

An object of the present invention is to provide an improved body frame for attachment to self-propelled vehicles and which is adapted to carry a load receiving body and to so support the load upon the frame that the center of gravity of the load will be maintained intermediate the axles of the vehicle to prevent the accidental tilting of the vehicle particularly when driven over rough ground.

Another object of the invention is to provide a frame of this character which may be applied to tractors, such as of the Fordson type with but slight change in the control levers and other easily shiftable and removable parts.

A further object is to provide a frame for attachment to a tractor and which supports and carries as a part of the frame the controlling mechanism which when the frame is in place may be quickly and easily coupled to the clutch and gear shifting levers of the tractor, so that the tractor may be controlled from a point at one side of the engine, so that the space between the engine and the driving axle may receive a relatively large load carrying body.

The invention also aims to provide a frame capable of attachment to a tractor and a dumping body, so mounted on the frame that the center of gravity of the body will pass through the end of the frame adjacent the engine and which will be shifted backwardly by the tilting of the body to a point such that the body may be easily dumped without liability of tilting the tractor.

A further object of the invention is to provide a dumping body for attachment to a tractor and which is of such construction that the dumping body may serve as an evener or scraper when in dumping position to facilitate the dumping and spreading of the load by utilizing the tractor directly and without the use of trailers or additional vehicles or devices. This object of the invention aims to reduce the number of workmen required in the conveying of loads of material and spreading the same and to also economize in the purchase and up-keep of equipment required in excavation and leveling work.

A more specific object of the invention is to provide a frame for application to a tractor and which includes an anchoring yoke or plate constructed to fit the transmission casing of the tractor in such manner that the bolts utilized in joining the sections of the transmission casing and engine casing together may be utilized for also securing this web or attaching plate in position; thus rigidly connecting the frame to the body part of the tractor and properly distributing the load and stresses imposed on the frame throughout the tractor structure.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary perspective view of a portion of a tractor having a frame constructed according to the present invention applied thereto and showing the control levers of the frame connected to the tractor.

Figure 3 is a similar view showing in full lines the body in dumping position.

Figure 4 is a fragmentary detail view, enlarged, of the shifting lever carried by the frame.

Figure 5 is a top plan view of the tractor with the attachment, shown in dumping and scraper position.

Figure 6 is a transverse section taken through the device taken on the line 6—6 of Figure 5 and looking toward the engine, and Figure 7 is a rear elevation of the device in dumping position, showing the structure of the material carrying body with its road scraping rear end.

Figure 1:
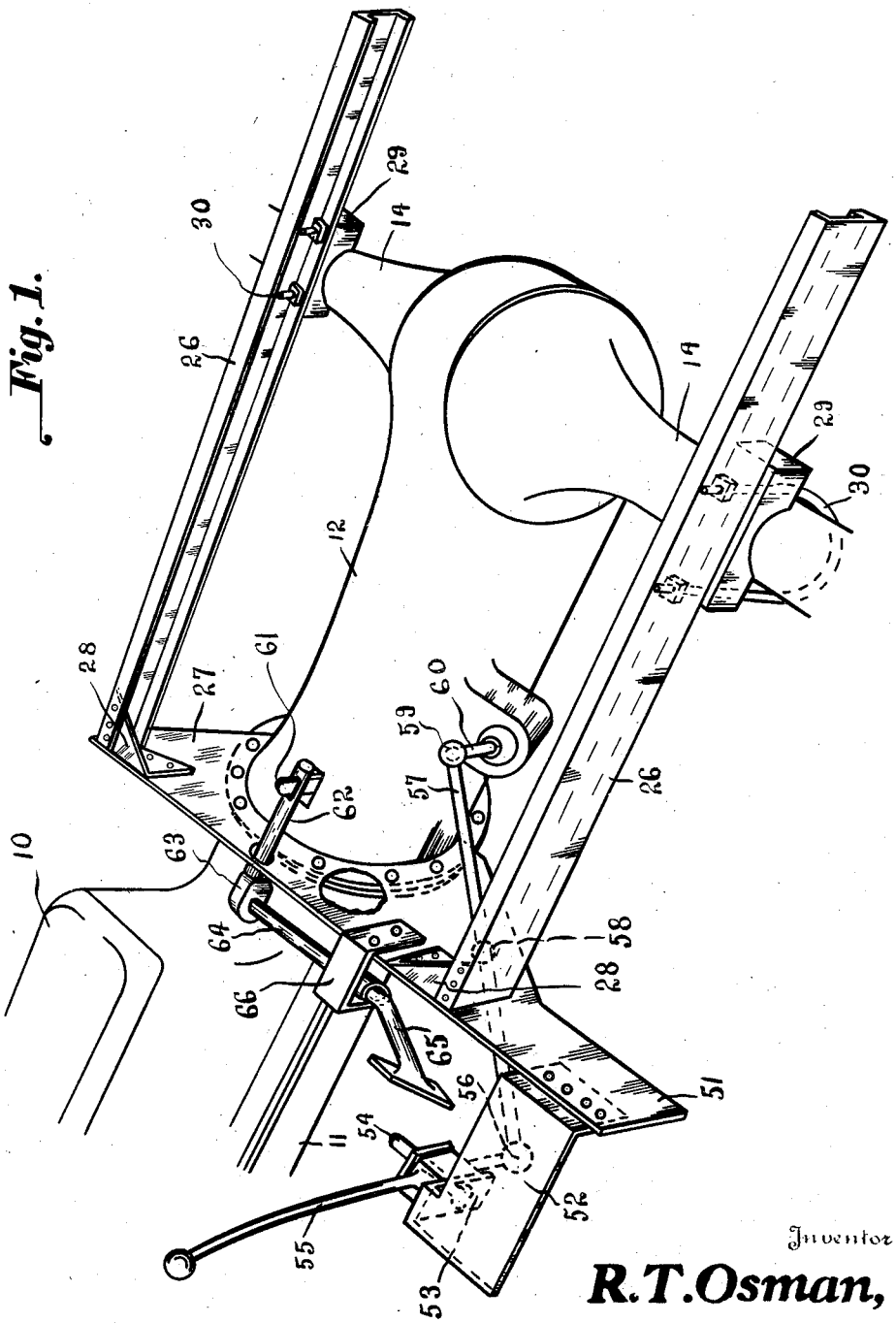

Referring to the drawings, the device of this invention is shown, and is particularly adapted for application to, a Fordson tractor and 10 designates the engine having the usual crank case 11 and gear case 12 secured thereto in the usual manner by bolts 13. The rear end of the gear case 12 is provided with the laterally extending axle housing 14 in which is disposed the drive axle 15 carrying the drive wheels 16. The tractor is provided with a front axle 19 on which are made the road engaging steering wheels 20 of the usual construction and which have steering arms 21 connected together by a tie rod 22 and which are controlled through the usual drag link 23. The engine 10 is provided with the usual radiator 24 mounted on the normal forward end of the tractor and a fuel tank 25 is disposed over the engine 10, and in the present instance is shortened to accommodate the devices of this invention.

According to this invention applicant provides a frame adapted to engage between the engine 10 and the normal rear end of the tractor and comprises a pair of channel side frames 26 which at their inner ends are connected together by a transverse yoke or plate 27 connected to the side rails 26 by angle plates 28 and which, when in position, extends downwardly in a plane at right angles to the side frames 26.

The yoke 27 may be of any suitable confiuration, but is disclosed in the present instance as of substantially triangular form with its lower tapering end cut out to provide a recess of substantially the configuration of the transmission case 12, so as to fit about the upper part thereof against the flange of the casing. The yoke 27 is provided with suitable openings through which the bolts 13 may project for securing the plate 27, the flange of the transmission casing 12, and the flanges of the motor 10 and crank case 11 together as a unit. The yoke or web 27 therefore provides a substantially and rigid support for the horizontal frame, so that the frame and the parts mounted thereon are connected directly to the motor and transmission casing to equally distribute the weight and strains imposed on the frame over the tractor structure.

The longitudinal side frames 26 extend rearwardly over the rear axle housing 14 and are provided with pillow blocks 29 which seat upon the axle housing 14 at opposite ends and are secured thereagainst and beneath the side rails by U-bolts 30 projecting about the under side of the axle housing 14. The side rails 26 extend rearwardly a suitable distance beyond the driving axle 15 and are adapted to support a load carrying body or container 31. The body 31 may be constructed of sheet metal or the like suitably reinforced and which at opposite sides is provided with a pair of channel rails or braces 32 which extend downwardly at the front of the body 31 and rearwardly across the bottom thereof for a length equal substantially to the distance between the vertical plane of the driving axle 15 and the engine 10. These channel rails 32 are thence curved upwardly and rearwardly from above the axle 15 to a point substantially opposite the rear ends of the side frames 26 to form rockers, and from such point are bent rearwardly and upwardly in any suitable configuration such as in a straight line, as shown to meet the upper rear edge of the body 31. The braces or rails 32 are thus formed substantially S-shape at their rear ends, and the body 31 is provided with a flat bottom 33 at its forward part and has a rear wall 34 which inclines upwardly from the rear edge of the bottom to a point substantially above the rear ends of the side rails 26 and which merges in to a spreader blade 35 forming the upper part of the back wall of the vehicle body, and which preferably flares upwardly and rearwardly to the ends of the braces 32. The vehicle body is provided with lower side walls 36 which are substantially vertical and of a height slightly greater than the height of the drive wheels 16, and a pair of upper side walls 37 which flare upwardly and outwardly to overhang the wheels 16 for the purpose of enlarging the upper part of the body to accommodate a relatively large load of material such as shown at 38 in Figure 2.

The upper side walls 37 extend rearwardly and meet the opposite lateral edges of the scraper 35, and the upper edge of this scraper 35 constitutes a scraping edge adapted to engage the material, as shown particularly in Figure 3, for spreading the same as the vehicle is moved against the material after it has been dumped, or during the dumping operation.

Figure 2:
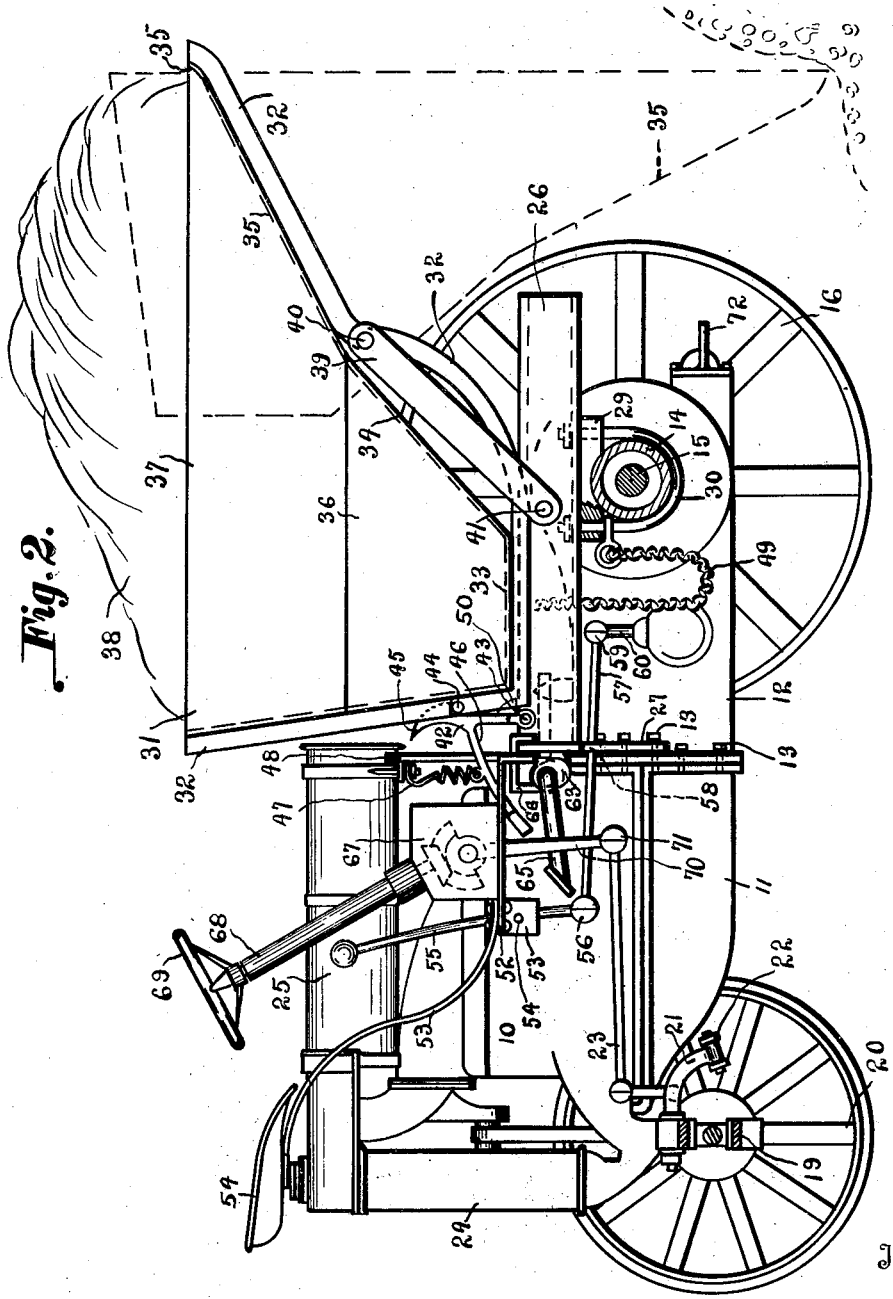
Figure 2 is a longitudinal vertical section taken through one side of the tractor with the improved devices of this invention applied thereto, the dotted lines showing the body in dumping position and in position to serve as a scraper.

It will be observed from Figures 2 and 5 particularly, that the braces 32 of the body 31 are of channel formation and have their flanges extending downwardly and in position to engage upon and overlap the side frames or pieces 26 of the main frame, so that the body 31 is held from lateral displacement during the traveling and vibration of the vehicle, and so that the body 31 is held in line with the frame when the body is rocked or tilted backwardly as it rolls upon the curved rocker portions of the braces 32. The body 31 is anchored to the frame by a pair of links 39 which are pivoted at 40 to the braces 32 at the tops of their rocker portions, and which are pivoted at 41, at their opposite ends. A latch dog 42 is pivotally connected at 43 to one of the side frames 26 and extends upwardly to normally engage over a pin 44 carried by one of the braces 32 at the front of the body 31. The latch 42 has a cam face 45 over which this pin 44 rides to force the latch 42 backwardly, so that the pin 44 may pass to a position beneath the shoulder of the latch. A foot lever 46 extends forwardly from the latch 42 and is adapted to be depressed by the operator to release the latch when it is desired to tilt the body 31. A spring 47 is connected to the foot lever 46 and extends upwardly therefrom to the top of a brace plate 48, which is secured to and rises from the connecting plate or yoke 27 for normally urging the latch 42 into locking position. The braces 32 are provided, beneath the bottom 33 of the body 31 with a pair of chains 49 which extend downwardly between the side frames 26 and are secured at their lower ends to the U-bolts 30, or other convenient place of attachment, for limiting the tilting of the body 31, so as to hold it with the rear upper edge of the body in scraping position, as shown in Figures 2 and 3.

The spring 47 urges the latch 42 to swing toward the body 31, and the latch is restricted in its swinging movement by a projection 50 forming a stop which engages the upper edge of the adjacent side rail 26 for holding the latch 42 in position to engage the pin 44 as the body 31 is swung into normal carrying position.

The yoke or plate 27 of the main frame is utilized for carrying the controls for the tractor, and for this purpose one end of the plate 27 has an extension 51, which projects beyond the adjacent side rail 26 and to which is secured a horizontal platform 52. The platform 52 extends alongside of the engine 10 and a spring seat post 53 is secured to the free end of the platform and carries a seat 54 disposed to face toward the body 31 and at such height that the operator on the seat may observe the ground by looking over the body 31. The platform 52, as best shown in Figure 4, has at its inner side a depending ear 53 carrying a bolt 54 on which is loosely pivoted a gear shifting lever 55 having a suitable handle or knob on its upper end and extending in proximity to the seat 54. The lower end of the lever 55 has a ball and socket joint 56 admitting of universal movement between the lever 55 and the connecting rod 57 which extends forwardly from the lever 55 and through an opening 58 in the plate 27 at a position inwardly of the adjacent side rails 26. This rod 57 has a ball and socket connection 59 with a relatively short arm or lever 60 projecting from the transmission case 12 for the purpose of shifting the gears in the case to obtain different speeds of the drive shaft 15 relatively to the speed of the engine 10.

Projecting from the gear case 12, through the top thereof in the usual manner, is a short clutch lever 61 over which is fitted a slotted thrust bar 62 slidable through the upper intermediate part of the plate or yoke 27. The projecting end of the thrust bar 62 engages a cam 63 carried on a rocker shaft 64 having a pedal 65 on one end so that by depressing the pedal 65 or shaft 64 is turned and the thrust bar 62 is moved inwardly to shift the clutch lever 61. A bracket 66 is secured to the plate 27 and forms a bearing for the rock shaft 64. A steering gear housing 67 is also mounted on the platform 52, as shown in Figures 2, 5 and 6 and supports an upwardly extending steering column 68 carrying a steering wheel 69 on its upper end in proximity to the seat 54.

The steering gear casing 67 carries the usual pinion and segment gears from which project a steering arm 70 disposed at the inner side of the platform 52 and which is connected by a ball and socket joint 71 to the drag link 23. The body portion of the tractor is of conventional form with the exception that the driving gears are reversed so as to operate the tractor rearwardly instead of forwardly in the normal direction of travel of the tractor, and such arrangement permits the operator to observe the movements of the dumping body 31 and to quickly release and control its operation, and also permits the operator to observe the scraping action of the free upper end of the body 31 when it is in lowered position.

It is apparent that as the body 31 is of substantial hopper shape with its flat bottom portion arranged toward the engine 10 that the center of gravity of the loaded body 31 is disposed inwardly of the drive axle 15, and therefore the body 31 will be normally held in carrying position and the latch 42 holds the body from any accidental rocking or dumping movements incident to the rough traveling of the tractor. When it is desired to dump the body, it is only necessary to depress the foot lever 46 and release the pin 44 when a slight pressure on the body will cause it to rock or roll upon the curved rocking portions of the braces 32. It will be noted that the curved portions of the braces are extended or spaced from the bottom 33 so as to more ably support the body 31 in upright position. The chains 49 serve to hold the body in tilted position, and in proper vertical position to bring the swinging edge of the body into proper contact with the material on the ground and to thus spread the material over the relatively wide mouth or delivery end of the body. It will be noted that the rear wall 35 of the body which constitutes the scraper blade is inclined in such position that it approaches a vertical plane when the body is tilted. This disposition of the scraper blade or bottom section 35 assists in the spreading action as well as in the delivery of the contents of the body when tilted.

When the body is in upright position, as shown in Figure 2, the tractor may be utilized in drawing or pushing various implements as the frame with the body are disposed wholly above the clevis 72 which is carried as a part of the usual tractor. The attachment does not interfere with the operation of the tractor and the frame carries the necessary controlling elements which may be coupled to the clutch and shifting mechanism in the gear case 12 without modifying the construction of the clutch or gears and in a manner which places the tractor under the complete control of the operator.

I do not wish to be restricted to the size, form, and proportions of the various parts, and obviously changes could be made in the construction herein described without departing from the spirit of the invention, it being only necessary that such changes fall within the scope of the appended claims.

What is claimed is:—

1. The combination of a tractor whose engine, transmission and driving axle housings constitute its frame, a load carrying attachment comprising a pair of longitudinal frame members positioned upon opposite sides of the transmission housing and extending rearwardly over the axle housing, means for attaching said frame members to said axle housing, a transverse yoke connecting the inner ends of said frame members and straddling said transmission housing, means for securing said yoke to said transmission housing, and a gravity dump body having rocking engagement with said frame members and normally supported on said frame members between said yoke and driving axle.

2. The combination of a tractor whose engine, transmission and driving axle housings constitute its frame, a load carrying attachment comprising a pair of longitudinal frame members positioned upon opposite sides of the transmission housing and extending rearwardly over the axle housing, means for attaching said frame members to said axle housing, a transverse yoke connecting the inner ends of said frame members and straddling said transmission housing, means for securing said yoke to said transmission housing, a gravity dump body, flanged rockers carried by said dump body and engaging the top faces of said frame members, said rockers having a horizontal rear portion normally supported upon said frame members between said yoke and driving axle.

In testimony whereof, I affix my signature.

RALPH T. OSMAN.